(12) United States Patent
Asif et al.

(10) Patent No.: US 7,171,806 B2
(45) Date of Patent: Feb. 6, 2007

(54) GRID CONSTRUCTION TO GATHERING OF WAVE AGGREGATES

(75) Inventors: Akbar Asif, Charlottenlund (DK); Erik Skaarup, Tagesmindevej 1, Gentofte (DK) DK-2820

(73) Assignee: Erik Skaarup, Gentofte (DK)

( * ) Notice: Subject to any disclaimer, the term of this patent is extended or adjusted under 35 U.S.C. 154(b) by 0 days.

(21) Appl. No.: 10/887,758

(22) Filed: Jul. 9, 2004

(65) Prior Publication Data

US 2005/0144937 A1    Jul. 7, 2005

Related U.S. Application Data

(63) Continuation of application No. PCT/DK03/00009, filed on Jan. 8, 2003.

(30) Foreign Application Priority Data

Jan. 9, 2002    (DK)    .................... 2002 00032

(51) Int. Cl.
*F03B 13/12*    (2006.01)
*F03B 13/20*    (2006.01)

(52) U.S. Cl. ........................................ 60/398; 290/53
(58) Field of Classification Search ............... 60/398; 290/53

See application file for complete search history.

(56) References Cited

U.S. PATENT DOCUMENTS

| 3,758,788 | A | | 9/1973 | Richeson | 290/42 |
|---|---|---|---|---|---|
| 4,048,512 | A | * | 9/1977 | Wood | 290/53 |
| 4,098,084 | A | | 7/1978 | Cockerell | 60/500 |
| 4,179,886 | A | * | 12/1979 | Tsubota | 60/398 |
| 4,249,084 | A | | 2/1981 | Villanueva et al. | 290/53 |
| 4,300,871 | A | * | 11/1981 | Laithwaite et al. | 60/398 |
| 4,341,074 | A | | 7/1982 | French | 60/504 |
| 4,454,429 | A | * | 6/1984 | Buonome | 290/53 |
| 4,661,716 | A | * | 4/1987 | Chu | 290/53 |
| 4,864,152 | A | * | 9/1989 | Pedersen | 290/53 |
| 5,084,630 | A | * | 1/1992 | Azimi | 290/53 |
| 5,443,361 | A | | 8/1995 | Skaarup | 415/3.1 |
| 6,365,984 | B1 | * | 4/2002 | Shu | 290/53 |
| 6,527,504 | B1 | | 3/2003 | Skaarup | 415/3.1 |

FOREIGN PATENT DOCUMENTS

FR    1 021 189    2/1953

* cited by examiner

*Primary Examiner*—Thomas E. Lazo
(74) *Attorney, Agent, or Firm*—Winston & Strawn LLP

(57) ABSTRACT

A plant that includes free-floating wave energy aggregates units for converting wave energy to another energy form. A plurality of smaller single units of wave energy aggregates is placed in a flexible grid construction. The plurality of smaller single units is connected to the grid construction in a manner so that it is fixed in a horizontal direction but flexible and capable of independent movement in a vertical direction. Advantageously, the plurality of smaller single units of the aggregate unit is placed in two staggered parallel rows arranged to take up a minimum amount of space without the plurality of smaller single units hitting each other.

13 Claims, 1 Drawing Sheet

GRID CONSTRUCTION TO GATHERING OF WAVE AGGREGATES

CROSS-REFERENCE TO RELATED APPLICATION

This application is a continuation of International application PCT/DK03/00009 filed Jan. 8, 2003, the entire content of which is expressly incorporated herein by reference thereto.

FIELD OF THE INVENTION

The purpose of this invention has been to make it easier to place and service wave energy aggregates, to achieve lower cost for the construction, and to achieve the same amount of kW out of the waves of the sea even with the use of a smaller area.

SUMMARY OF THE INVENTION

The invention relates to a plant comprising free-floating wave energy aggregates units for converting wave energy to another energy form wherein a plurality of smaller single units of wave energy aggregates is placed in a flexible grid construction. In this plant, the wave energy can be converted to electricity, air-or fluid pressure or a mechanical force.

The flexible grid construction preferably has fixed distance tools or rods and includes flexible parts of chain pieces or rubber to provide flexible connections therebetween. If desired, the grid construction may include damping plates or rudders in different places. The grid construction can further include rods that have an additional form of built in flexibility, i.e., metallic or hydraulic, for additional flexibility.

The grid construction of the plant preferably has a built in shared floating control or energy gathering unit. In addition, the grid construction can include one or more anchors for affixing the plant to a sea bed, or it can have a bottom fixed construction so that the plant is configured to float by itself for use as a platform. Generally, the platform comprises a wind turbine or hydrogen station.

Accordingly, the grid construction of the invention is compatible with the devices of disclosed in U.S. Pat. No. 5,443,361, or International Applications PCT/DK00158 or PCT/DK99/00327.

DETAILED DESCRIPTION OF THE INVENTION

The present grid construction make it possible, to achieve lower weight because of the units get smaller but strong enough to resist the forces of the sea on the smaller size (wave front).

A smaller size to achieve the same amount of kW generally has to use more units. This leads to a bigger production (mass production) that makes it cheaper to achieve the same kW out of the waves.

Figure 1:
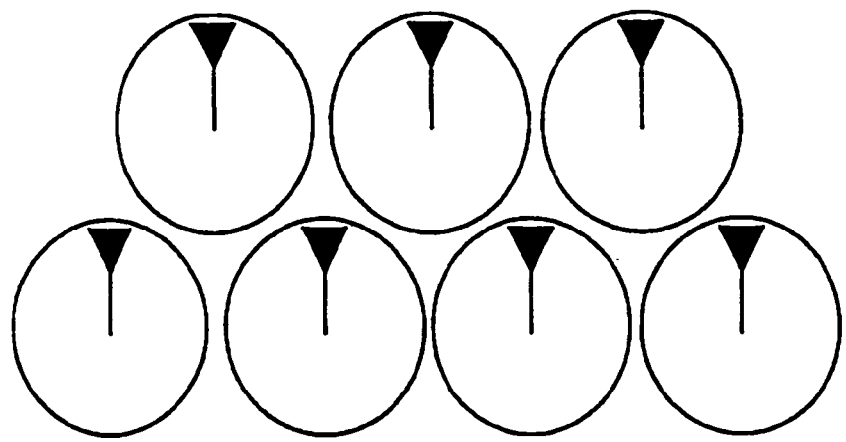
FIG. 1 is a view of a normal size of a wave energy aggregate park with 7 wave energy aggregates position to not bump into or hit each other.
Figure 2A:
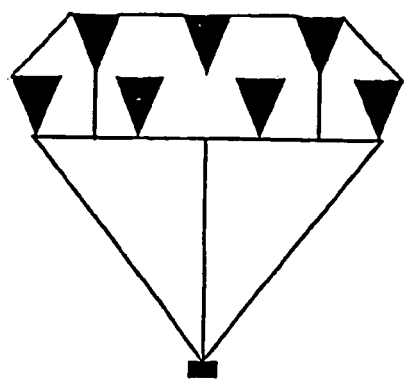
FIGS. 2A and 2B are schematic views of the same 7 wave energy aggregates, with FIG. 2A illustrating those aggregates placed in a new wave energy grid and FIG. 2B illustrating the same arrangement but with half size aggregates.
Figure 2B:
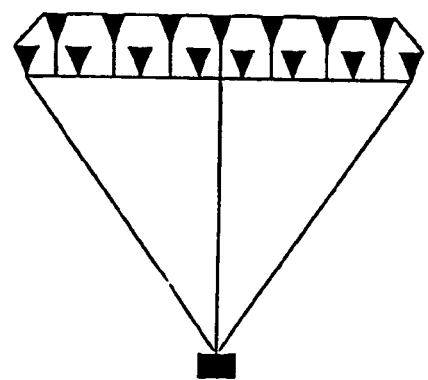

FIG. 1 illustrates a conventional wave energy aggregate plant with 7 normal sized wave energy aggregates position to not bump into or hit each other. If these were placed in a new wave energy grid, their appearance would be similar to that of FIG. 2A. FIG. 2B illustrates a preferred feature of the invention in that the same new wave energy grid arrangement is shown but with half size aggregates. One will save about 70–75% material in the single wave energy aggregates of half size compared to a single wave energy grid arrangement that uses full-size aggregates.

The invention is in the first place thought to be uses for specific wave energy aggregates, but can also be used to nearly any other floating wave energy aggregates.

In the calculations to find the necessary distance between wave energy aggregates at sea, it was clear, that a wave energy park or grid arrangement would take up too much space to operate efficiently. Such floating wave energy devices must not be able to hit into each other, when there is no waves and no wind, so that they must be spaced accordingly.

To be close enough to each other, without hitting each other, they also need to be fixed, and the present invention uses something that is flexible, rods, chains, etc., for this purpose. The power of the sea is so enormous that it is better to allow a flexible component to bend when encountering these force rather than to try to resist them. The construction price is also much cheaper in a device with such flexible components.

The normally trend in wave energy aggregates is built on the principle from wind energy industry: get as many MW on fewest items. A given width of wave front contains a certain amount of energy. A double width contains twice as much energy, so that it is desirable to build it twice as large.

To construct a double width wave energy aggregate in a traditional way, such that it is able to resist very large forces, it takes material to at least the third power, which for double the size is 2×2×2=8 times. The wave energy aggregate is not only double in width, but also double in height and depth in the bearing dimensions of material. But one only achieves the double energy of energy.

Actually there are used 6 times more material to exchange the two single wave energy aggregates to a new double width wave energy aggregate.

The grid construction is a flexible grid; there is fulfilling the demands for a park of wave energy aggregates to take up less space without the aggregates can hit each other.

The grid constructions consist of sticks, that are holding the aggregates fixed in a horizontal direction, but that are flexible in a vertical direction. When this achievement is reached, then you as well can go a step further, by making the things smaller (to a limit fitted to the conditions) and by this achieve price and weight reductions with all its attendant advantages.

With the new flex grid, then, constriction is much cheaper. It can be adjusted in series and sizes to any sea area and to the demand of MW that is desired.

What is claimed is:

1. A plant comprising free-floating wave energy aggregate units for converting wave energy to another energy form wherein a plurality of smaller single units of wave energy aggregate is placed in a flexible grid construction, with the plurality of smaller single units connected to the grid construction to be fixed in a horizontal direction but flexible and capable of independent movement in a vertical direction; wherein the plurality of smaller single units of the aggregate unit is placed in two staggered parallel rows arranged to take up a minimum amount of space without the plurality of smaller single units hitting each other, and the smaller single units are connected by rods or sticks that hold the smaller single units fixed in a horizontal plane but flexibly to allow independent movement in a vertical direction.

2. The plant according to claim 1 wherein the wave energy is converted to electricity, air-or fluid pressure or a mechanical force.

3. The plant according to claim 1 wherein the flexible grid construction has fixed distance tools or rods and includes flexible parts of chain pieces or rubber to provide flexible connections therebetween.

4. The plant according to claim 1 wherein the grid construction includes damping plates in different places.

5. The plant according to claim 1 wherein the grid construction has rudders in different places.

6. The plant according to claim 1 wherein the grid construction further includes rods that have an additional form of built in flexibility.

7. The plant according to claim 6 wherein the additional form of built-in flexibility is metallic or hydraulic.

8. The plant according to claim 1 wherein the grid construction has a built in shared floating control or energy gathering unit.

9. The plant according to claim 1 wherein the grid construction includes one or more anchors for affixing the plant to a sea bed.

10. The plant according to claim 1 wherein the grid construction includes a bottom fixed construction.

11. The plant according to claim 1 wherein the grid construction is configured to float by itself for use as a platform.

12. The plant according to claim 11 wherein the platform comprises a wind turbine or hydrogen station.

13. The plant of claim 1, wherein the free-floating wave energy aggregate units are connected by rods or sticks that hold the aggregate units fixed in a horizontal plane, but that are flexible but allow independent movement in a vertical direction.

* * * * *